United States Patent
Xu et al.

(10) Patent No.: US 6,577,798 B2
(45) Date of Patent: Jun. 10, 2003

(54) METHOD FOR PRODUCING NON-LINEAR OPTICAL ORGANIC CRYSTAL FILM

(75) Inventors: Jianjun Xu, West Covina, CA (US); Bunsen Fan, Peekskill, NY (US)

(73) Assignee: Reveo, Inc.

( * ) Notice: Subject to any disclaimer, the term of this patent is extended or adjusted under 35 U.S.C. 154(b) by 45 days.

(21) Appl. No.: 09/905,326

(22) Filed: Jul. 12, 2001

(65) Prior Publication Data

US 2002/0041427 A1 Apr. 11, 2002

Related U.S. Application Data

(60) Provisional application No. 60/219,099, filed on Jul. 18, 2000.

(51) Int. Cl.$^7$ .............. G02B 6/00; G02B 6/10; G02B 6/12; H01L 21/00
(52) U.S. Cl. .......... 385/122; 385/14; 385/129; 385/130; 438/29; 438/31
(58) Field of Search .......... 385/122, 14, 129, 385/130, 131, 52; 252/582; 299.4; 438/29, 31; 65/385, 386; 349/94, 123, 126; 428/1.2–1.33

(56) References Cited

U.S. PATENT DOCUMENTS

| | | | |
|---|---|---|---|
| 4,684,434 A | | 8/1987 | Thakur et al. .............. 117/5 |
| 4,763,893 A | | 8/1988 | Barthlome ................. 601/40 |
| 5,011,623 A | | 4/1991 | Hideaki et al. .......... 252/299.5 |
| 5,084,302 A | | 1/1992 | Yoshiro et al. ............. 427/164 |
| 5,279,870 A | | 1/1994 | Kester ...................... 428/1 |
| 5,305,126 A | * | 4/1994 | Kobayashi et al. ........... 349/94 |
| 5,385,116 A | | 1/1995 | Hattori et al. .............. 117/5 |
| 5,518,782 A | * | 5/1996 | Takao et al. ............... 428/1.25 |
| 5,612,387 A | * | 3/1997 | Ogawa .................. 156/274.4 |
| 5,807,498 A | * | 9/1998 | Gibbons et al. .......... 252/299.4 |
| 6,106,743 A | * | 8/2000 | Fan ........................ 252/582 |
| 6,303,056 B1 | * | 10/2001 | Fan et al. ................. 252/582 |

FOREIGN PATENT DOCUMENTS

EP 0689084 12/1995

OTHER PUBLICATIONS

M. Thakur et al, Growth and nonlinear optical properties of single crystal films of polydiacetylenes, Proceedings of the SPIE, 1104, 261 (1989).
N. Coustel et al, 'Structural characterization of oriented polyacetylene films grown by the liquid crystal method,' Macromolecules, 24, 5867 (1991).
T. Suhara et al, Growth of metanitroaniline film crystal with controlled orientation for optical waveguide second–harmonic generation, IEEE Phtonics Technology Letters, 3, 241 (1991).
Patent Abstracts of Japan, vol. 017, No. 207 (P–1525), Apr. 22, 1993 & JP 04 348325 A (Hitachi Ltd) Dec. 3, 1992 abstract.

* cited by examiner

*Primary Examiner*—Evelyn Lester
*Assistant Examiner*—Jack Dinh
(74) *Attorney, Agent, or Firm*—Richard L. Sampson; Ralph J. Crispino

(57) ABSTRACT

Methods for fabricating a non-linear optical (NLO) film and a NLO film structure produced thereby are provided. The methods include depositing an alignment layer material on at least one surface of a substrate, aligning the molecules of the alignment layer material in a substantially uniaxial direction, and depositing a NLO film on the alignment layer material. The methods may be advantageous in that they tend to produce NLO films having relatively strong NLO properties. The methods may be further advantageous in that they are relatively simple and may be applied to a wide range of organic NLO materials.

36 Claims, 7 Drawing Sheets

METHOD FOR PRODUCING NON-LINEAR OPTICAL ORGANIC CRYSTAL FILM

This application claims the benefit of U.S. Provisional Application Ser. No. 60/219,099, entitled Method for Producing Oriented Organic Crystal Film, filed on Jul. 18, 2000.

BACKGROUND OF THE INVENTION (1) Field of the Invention

The present invention relates to organic crystal films and more particularly to organic crystal films for nonlinear-optics applications.

(2) Background Information

Increasing bandwidth has become an increasingly pressing requirement of modem communications systems. As fiber optics replaces electrical cabling, WDM and DWDM techniques are used to exploit a greater fraction of the available fiber optic bandwidth. Simultaneously, packet-switched signal architectures are gradually replacing TDM techniques in many application sectors. However, despite the impressive resources invested in these efforts to expand bandwidth, one significant bottleneck remains—switching node (interconnect) hardware. Current interconnection devices typically require the data to be first converted to an electrical signal, routed to the correct output, and then re-converted to an optical signal. This opto-electronic interface introduces latencies and substantially reduces the overall bandwidth of the system. All-optical (i.e., without opto-electronic conversion) switching technologies utilizing MEMS (microelectromechanical system) or polarization-based technologies may preserve the fiber bandwidth but tend to switch slowly, introducing latencies that limit their applicability.

Nonlinear optical (NLO) materials offer rapid switching speeds. However, a need exists for improved performance while overcoming the drawbacks associated with current NLO materials. For example, devices using inorganic NLO crystals such as titanium-diffused lithium niobate (Ti:LiNbO$_3$) tend to have inferior performance due to their weak NLO properties. In addition, temporal and thermal stability as well as radiation sensitivity are well-known problems. Furthermore, these conventional inorganic crystal devices are relatively difficult to integrate directly with electronics.

NLO devices based on thin films of poled organic polymers may be a viable solution, since such organic materials are low cost and readily processed. Hundreds of nonlinear organic materials have been synthesized and characterized, and devices using such materials have been demonstrated. However, these poled polymers tend to have the following disadvantages: small second-order susceptibility, low optical damage threshold, high scattering losses, and limited temperature and temporal stability. Thus, poled NLO polymers still require a breakthrough in development to achieve practicality, despite the inherent advantages of the organic materials.

One way of taking advantage of thin film organics while potentially overcoming these limitations is using NLO organic crystal films, which have tend to have a very high optical nonlinearity, higher damage threshold, and low scattering loss. Hattori et al., in U.S. Pat. No. 5,385,116, has reviewed various techniques for fabricating organic crystal films. However, significant manufacturability issues for practical devices generally remain. Until, and unless these problems are solved, the inherently superior organic NLO crystal materials likely will not realize their potential.

Therefore there exists a need for an improved optical film that exhibits large nonlinear optical effects while overcoming drawbacks of film devices.

SUMMARY OF THE INVENTION

One aspect of the present invention includes a method for fabricating a crystalline, non-linear optical (NLO) film. The method includes providing a substrate, an alignment layer material including elongated polymeric molecules, and at least one NLO material. The method further includes depositing a thin layer of the alignment layer material on at least one surface of the substrate, aligning the molecules of the alignment material in a substantially uniaxial direction, and depositing a layer of the at least one NLO material on the alignment layer material. In another aspect, this invention includes a film structure fabricated by the method described hereinabove in this paragraph.

In a further aspect, this invention includes a method for fabricating a crystalline NLO film. The method includes providing a substrate, an alignment layer material including elongated polymeric molecules, and at least one NLO material. The method further includes depositing a thin layer of the alignment layer material on at least one surface of the substrate, aligning the molecules of the alignment layer material in a substantially uniaxial direction, depositing a seed layer of one of the at least one NLO material on the alignment material, and depositing another layer of one of the at least one NLO material on the seed layer. In a still further aspect, this invention includes a NLO film structure fabricated by the ma described hereinabove in this paragraph.

DETAILED DESCRIPTION

The present invention includes a method for producing crystalline organic, non-linear optical (NLO) films, in a pre-determined crystalline orientation. Briefly, the method includes depositing an alignment layer material on a substrate such as glass. The alignment layer molecules are then aligned in a uniaxial direction. A NLO material may then be deposited on the alignment layer, producing a crystalline NLO film, the molecules of which are aligned with those of the alignment layer. The method of this invention may be used to produce crystalline, NLO materials for a host of NLO applications, including electro-optic applications as discussed in more detail hereinbelow. This invention is potentially advantageous in that it produces an NLO film having relatively strong NLO properties. This invention is further advantageous in that it is relatively simple and may be applied to a wide range of organic NLO materials.

Figure 1:
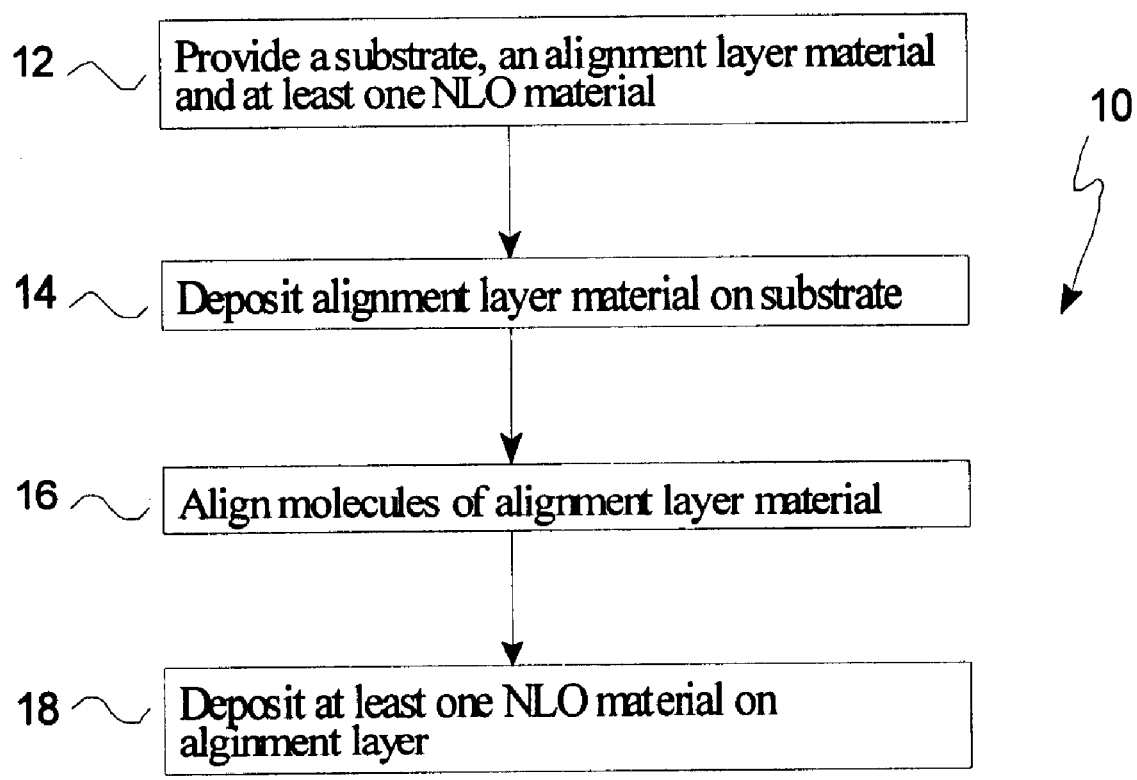
FIG. 1 is a flow chart representation of one embodiment of the method of the present invention.

Referring to FIG. 1, a flowchart of a method 10 for producing a crystalline NLO material is illustrated. A substrate, an alignment layer material, and at least one NLO material are provided 12. The alignment layer material is deposited 14 on the substrate and treated 16 to align the elongated molecules thereof in a substantially uniaxial direction. The NLO material is then deposited 18 on the alignment layer.

Figure 2:
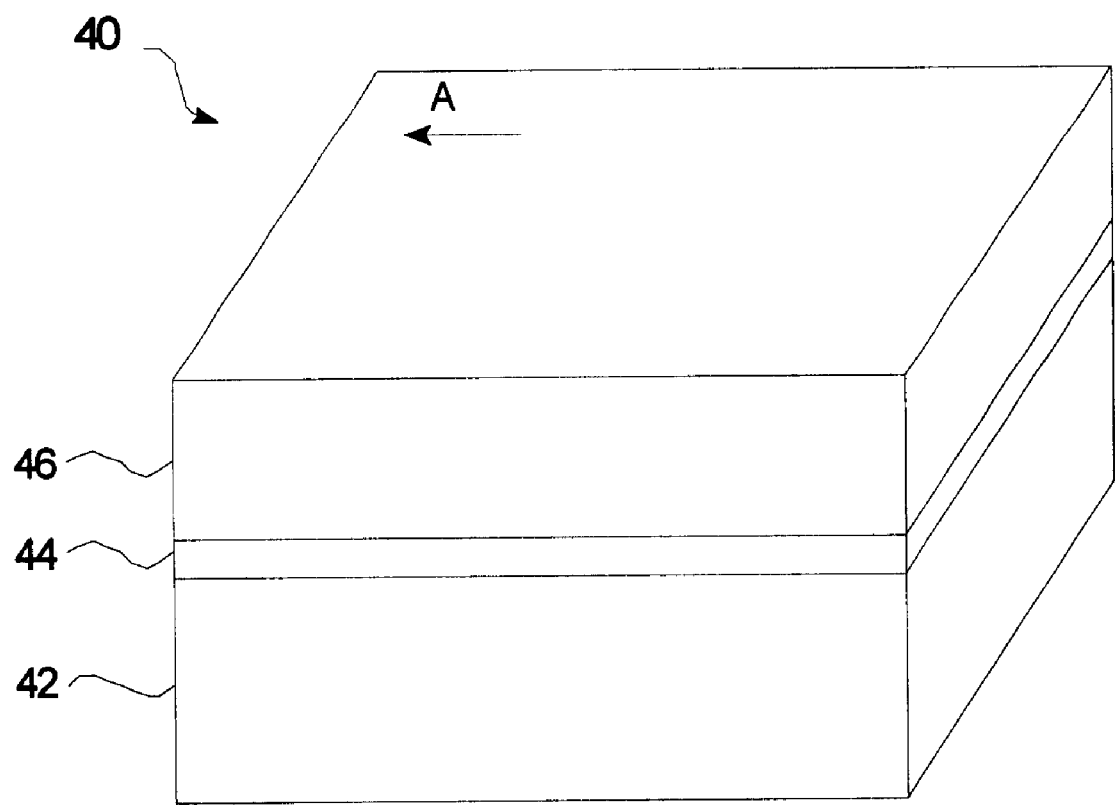
FIG. 2 is a schematic representation of a film structure including a crystalline NLO material produced by the method of FIG. 1.

Referring now to FIG. 2, a NLO film structure 40 produced by method 10 is illustrated. Structure 40, as shown, includes a crystalline NLO film 46 superposed with a substrate 42. An alignment layer 44 is interposed therebetween. The elongated molecules (not shown) of alignment layer 44 are aligned substantially in parallel with one another (e.g., in parallel with axis A) after treatment 16 (FIG. 1).

The NLO molecules, which also tend to be elongated, are further aligned with the alignment layer molecules. The mechanism for alignment of the NLO molecules with the alignment layer molecules is not fully understood, but likely includes molecular interactions that minimize 'free energy' at the interface between the two materials (i.e., the interface between layers 44 and 46). The alignment of the NLO molecules results in a film structure 46 having relatively strong NLO properties as discussed further hereinbelow.

Substrate 42 may include substantially any material. Generally desirable substrate materials include fused quartz, glass, silicon, gallium-arsenide, alkali halides, plastic materials, acrylic, polycarbonate, poly(methyl-methacrylate), and the like. For applications in which the crystalline NLO film 46 is used as an optical element, it is typically desirable to use a substantially optically transparent material such as glass, acrylic, polycarbonate, poly (methyl-methacrylate), and the like. Glass is a desirable substrate material since the index of refraction thereof may be tuned over a wide range. For example, in constructing an optical waveguide with the NLO crystal film, a glass substrate having an index of refraction less than that of the NLO film may be employed. Silicon (Si) and gallium-arsenide (GaAs) are also desirable substrate materials, since they allow optical devices employing the NLO crystal film of this invention to be integrated with semiconductor electronic devices.

Alignment layer 44 may include substantially any alignment layer material (e.g., a polymeric material) having elongated molecules that may be aligned in a substantially uniaxial direction. Polyimide is one example of a desirable alignment layer material. Polyvinyl alcohol (PVA) is another desirable alignment layer material. In one example, one surface of a substrate may be coated with a thin polyimide film. The alignment layer 44 is then treated 16, e.g., by mechanically 'rubbing', for example, with a nylon pile or other brush-like implement, to align the alignment layer molecules in a preferential direction. It is also possible to treat an alignment layer without mechanical rubbing, for example, using conventional optical radiation properly illuminated on a suitable thin coating on the contact surface. Polarized light, for example, may interact with the alignment layer molecules causing them to fully or partially align with the polarization direction of the incident light. The alignment layer material may be disposed on the substrate 42 using any of several known thin film deposition techniques, such as spin coating, vapor deposition, solvent evaporation, and the like.

NLO layer 46 may include substantially any organic material that exhibits non-linear optical properties and forms crystals, which are currently available or may be synthesized in the future. For example, the following is a partial list of organic compounds that provide for NLO films: N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene)aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC). The NLO layer 46 may be deposited on the alignment layer 44 using any of several known thin film deposition techniques, such as spin coating, vapor deposition, solvent evaporation, slowly cooling a molten liquid, and the like.

Figure 3:
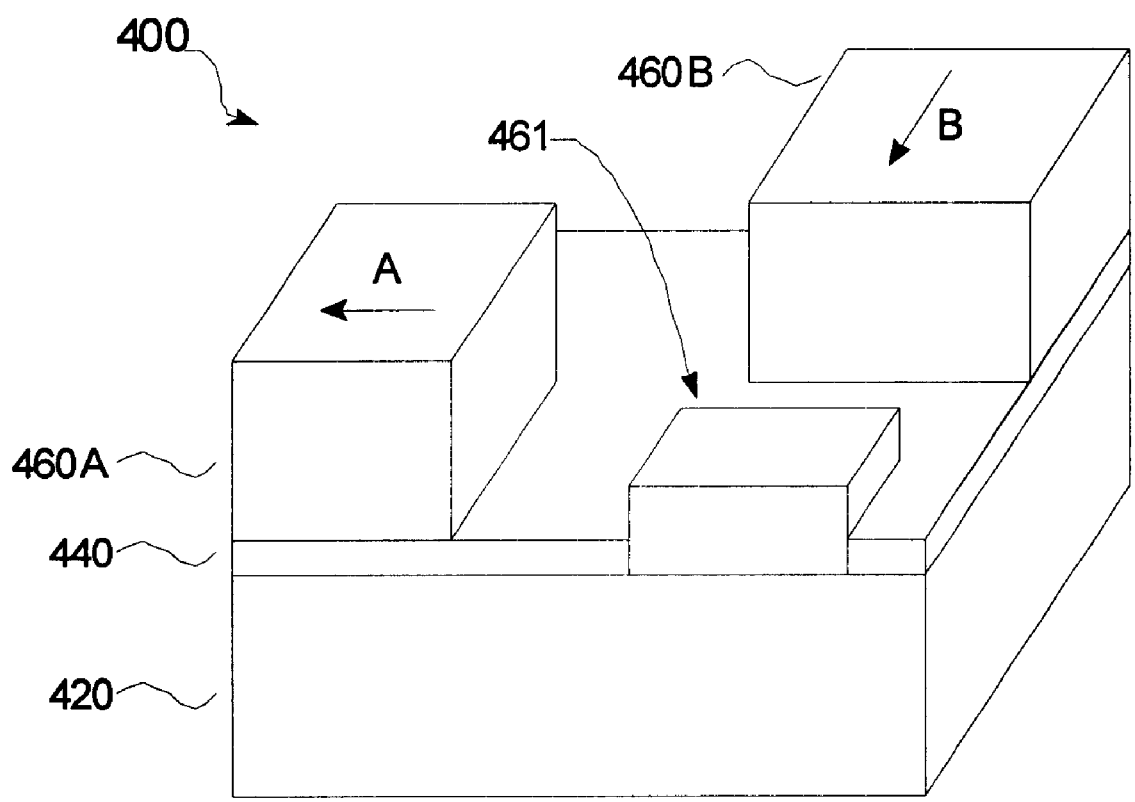
FIG. 3 is a schematic representation of another film structure including a crystalline NLO material produced by the method of FIG. 1.

The artisan of ordinary skill will readily recognize that a substrate may be treated to include a plurality of regions, in which the alignment layer molecules in one region are oriented at a non-zero angle (e.g., perpendicular) to the alignment layer molecules of another region. In this manner the method of this invention may be utilized to fabricate a structure including multiple NLO crystals (e.g., multiple discrete crystal portions/regions) with distinct orientations. For example, referring now to FIG. 3, a structure 400 including a plurality of NLO crystals 460A, 460B is shown. The NLO molecules in NLO crystal 460A are substantially parallel to axis A while those in NLO crystal 460B are substantially parallel to axis B. Axes A and B are typically perpendicular, but may be oriented at any angle relative to one another. Substrate 420 is substantially similar to substrate 42 (FIG. 2) described hereinabove. Alignment layer 440 is similar to alignment layer 44 (FIG. 2) described hereinabove, however, layer 440 includes at least two regions, a first having alignment layer molecules that are substantially parallel to axis A and a second having alignment layer molecules that are substantially parallel to axis B. Structure 400 may further include a device 461, such as an electronic drive circuit, built on (or into) the substrate (e.g., a silicon wafer).

Figure 4:
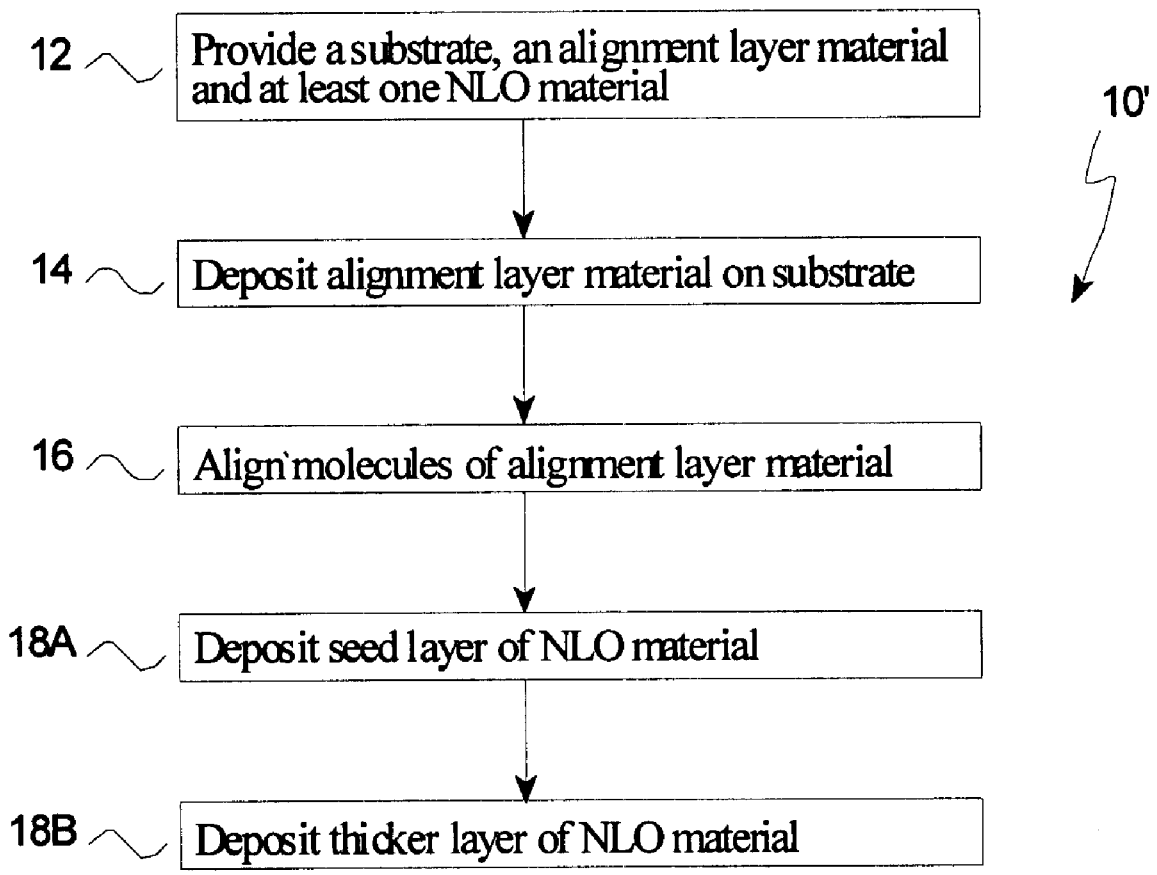
FIG. 4 is a flow chart representation of another embodiment of the method of this invention.

Turning now to FIG. 4, an alternate method 10' of this invention is illustrated. Method 10' is similar to method 10 in that an alignment layer 44 is deposited 14 on a substrate 42 and the alignment layer 44 is treated to align 16 the elongated molecules thereof in a uniaxial direction. A relatively thin seed layer of an NLO material is deposited 18A on the alignment layer. The molecules of the seed layer 46A are aligned with the molecules in the alignment layer 44 (in the manner described hereinabove with respect to layer 46) and may provide an epitaxial base for a subsequent thicker (e.g., 1 micron or more) crystalline NLO layer 46B (FIG. 5) which is deposited 18B on the seed layer 46A. The seed layer 46A and thicker crystalline NLO layer 46B each may be made from substantially any organic material that exhibits non-linear optical properties and forms crystals, including the partial list referred to hereinabove with respect to method 10 (FIG. 1).

Figure 5:
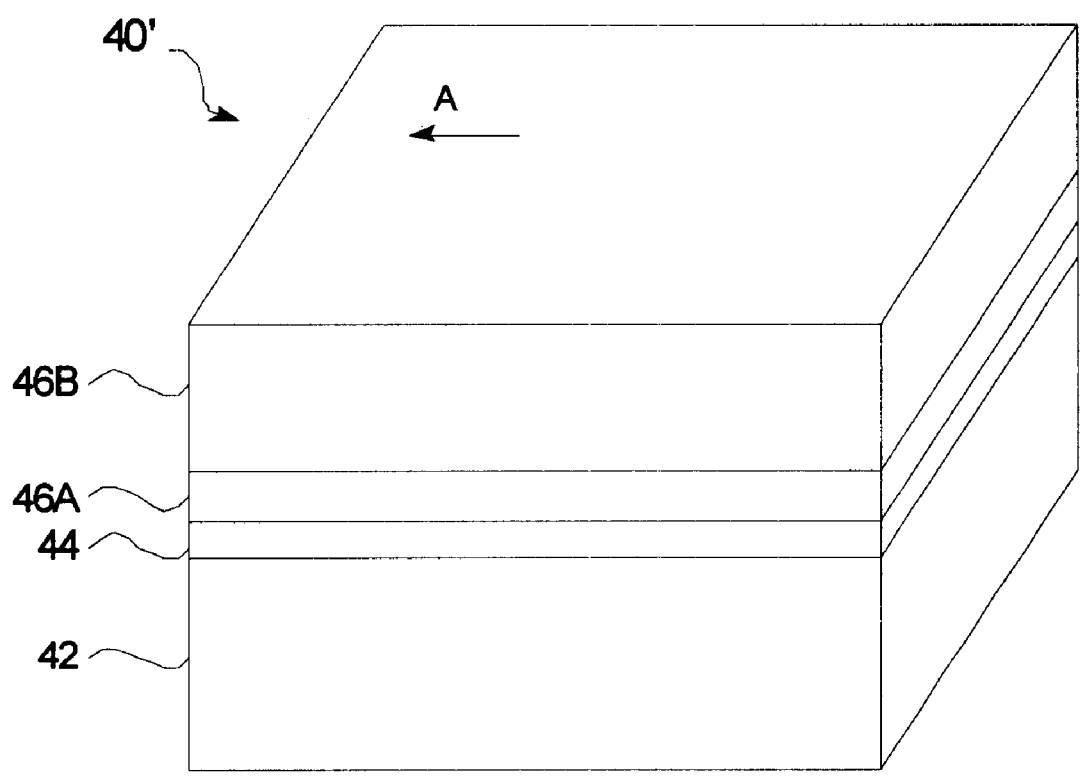
FIG. 5 is a schematic representation of a film structure including a crystalline NLO material produced by the method of FIG. 3.

Referring now to FIG. 5, a NLO film structure 40' produced by method 10' is illustrated. NLO film 40' is similar to that of film 40 (FIG. 2) in that it includes an alignment layer 44 deposited on a substrate 42. NLO film 40' further includes an NLO seed layer 46A interposed between alignment layer 44 and a thicker NLO layer 46B. NLO layers 46A and 46B may include the same NLO material or different NLO materials. In one embodiment NLO seed layer 46A includes N-(4-nitrophenyl)-(L)-prolinol (NPP), while NLO layer 46B includes at least one member of the partial list referred to hereinabove.

The methods of this invention may further optionally include thermally annealing the crystalline NLO film(s) 46, 46A, 46B to reduce defects. The time and temperature profiles of any thermal annealing step depend strongly on the NLO material utilized. For a NLO film including NPP, annealing at a temperature from about 90 to about 95° C., (which is close to the melting point) may be useful. For example, one annealing process includes heating a NLO crystal film to a temperature just below its melting point and then gradually cooling it. Typical cooling times may vary from a few hours to a few days. Proper annealing tends to reduce defects since at elevated temperatures. The NLO molecules are relatively mobile and therefore may reorient to an orientation having a lower free energy. This may eliminate voids and/or other defects and result in a better quality crystal. Upon cooling, the NLO molecules are 'frozen' in place. Repeated thermal annealing cycles may further improve crystal quality. Other annealing and/or heat-treating techniques known to those skilled in the art of materials science in general and crystal growth in particular may be employed.

The methods of this invention are advantageous for providing crystalline NLO films 46, 46A, 46B having relatively strong non-linear properties, which may be useful in a host of non-linear optical applications, such as electro-optic applications (e.g., those in which an electric field is applied to impart a phase retardation to an optical beam) and optical second harmonic generation applications (e.g., those in which the spectral frequency of incident light is doubled). Other potential applications include wavelength up- or down-conversion applications (e.g., those in which incident light of two distinct wavelengths $f_1$ and $f_2$, is converted to light of another wavelength $f_3$, in which $f_3=f_1+f_2$ or $f_3=f_1-f_2$), parametric oscillation applications (e.g., those in which incident light is converted into two output beams of two distinct wavelengths), or optical rectification applications (e.g., those in which incident light is converted to electrical signals), as well as other NLO applications known those skilled in the optical arts, and other NLO applications that may be developed in the future.

The following example illustrates one embodiment of the method(s) of this invention. The scope of this invention is not to be considered as limited by the specific embodiment described therein, but rather as defined by the claims.

EXAMPLE 1

A control structure was fabricated, including a glass substrate 42 coated with a polyimide alignment layer 44 deposited by spin coating a solution of polyimide. The solvent was evaporated by heating the coated substrate at a relatively low temperature (less than about 90° C.). The polyimide layer was further cured at a relatively high: temperature (about 300° C.). The polyimide alignment layer 44 was then mechanically rubbed 16 in a uniaxial direction using a nylon pile.

A structure 40 according to the present invention was fabricated, including a glass substrate 42 coated with a polyimide layer 44 and mechanically rubbed in a manner substantially identical to that of the control structure. A thin layer 46 of N-(4-nitrophenyl)-(L)-prolinol (NPP) NLO material (which may be purchased from Sigma/Aldrich Corp, Milwaukee, Wis.) was then deposited 18 on the rubbed polyimide layer 44 by dipping the substrate (including the rubbed polyimide layer) into a solution of NPP dissolved in acetone. Upon removal of the substrate from the aforementioned solution, the acetone was slowly evaporated leaving a relatively thin NPP layer. An NPP layer may also be deposited by melting a sample of NPP on the treated substrate and allowing the melt to spread over the surface of the substrate. This latter deposition method tends to form a relatively thick NPP layer.

The relative transmittance of both the control and the exemplary structure 40 were then determined spectroscopically (over a wavelength range from about 350 to about 800 nanometers) for each of two linear polarization states, the first oriented in a direction substantially parallel to the rubbing direction and the second in a direction substantially perpendicular to the rubbing direction.

Figure 6:
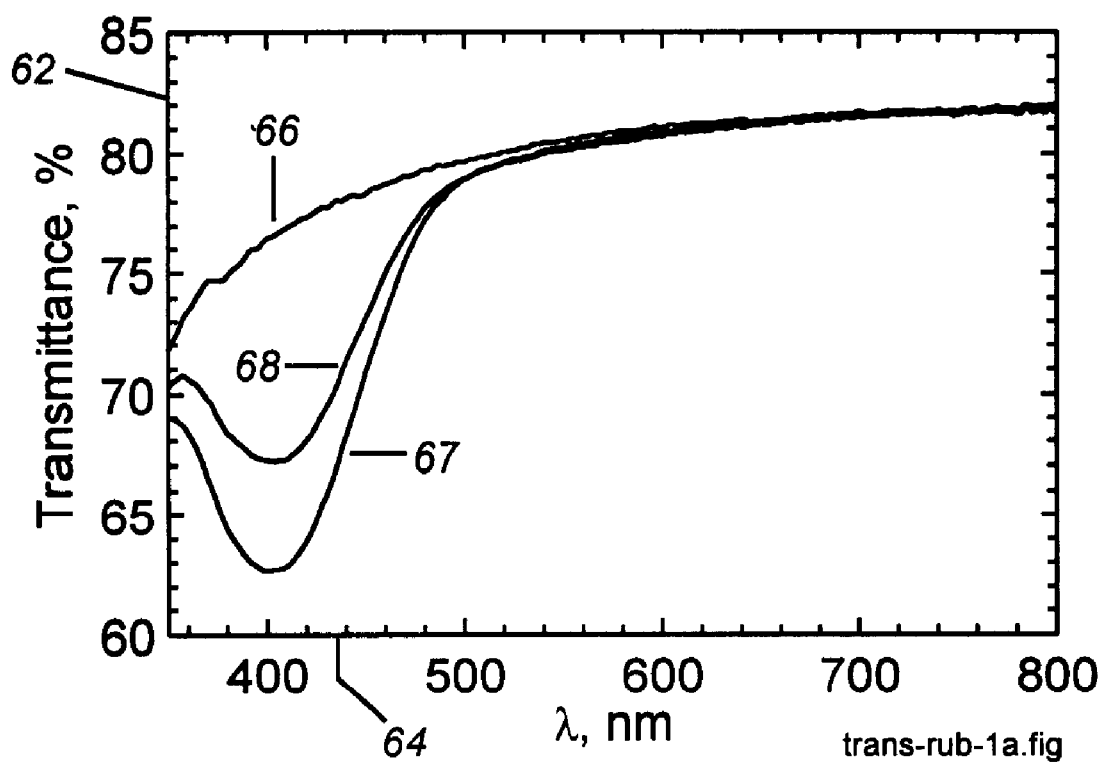
FIG. 6 is a representative plot of relative transmittance versus wavelength for a crystalline NLO material produced by the method of this invention.
Figure 7:
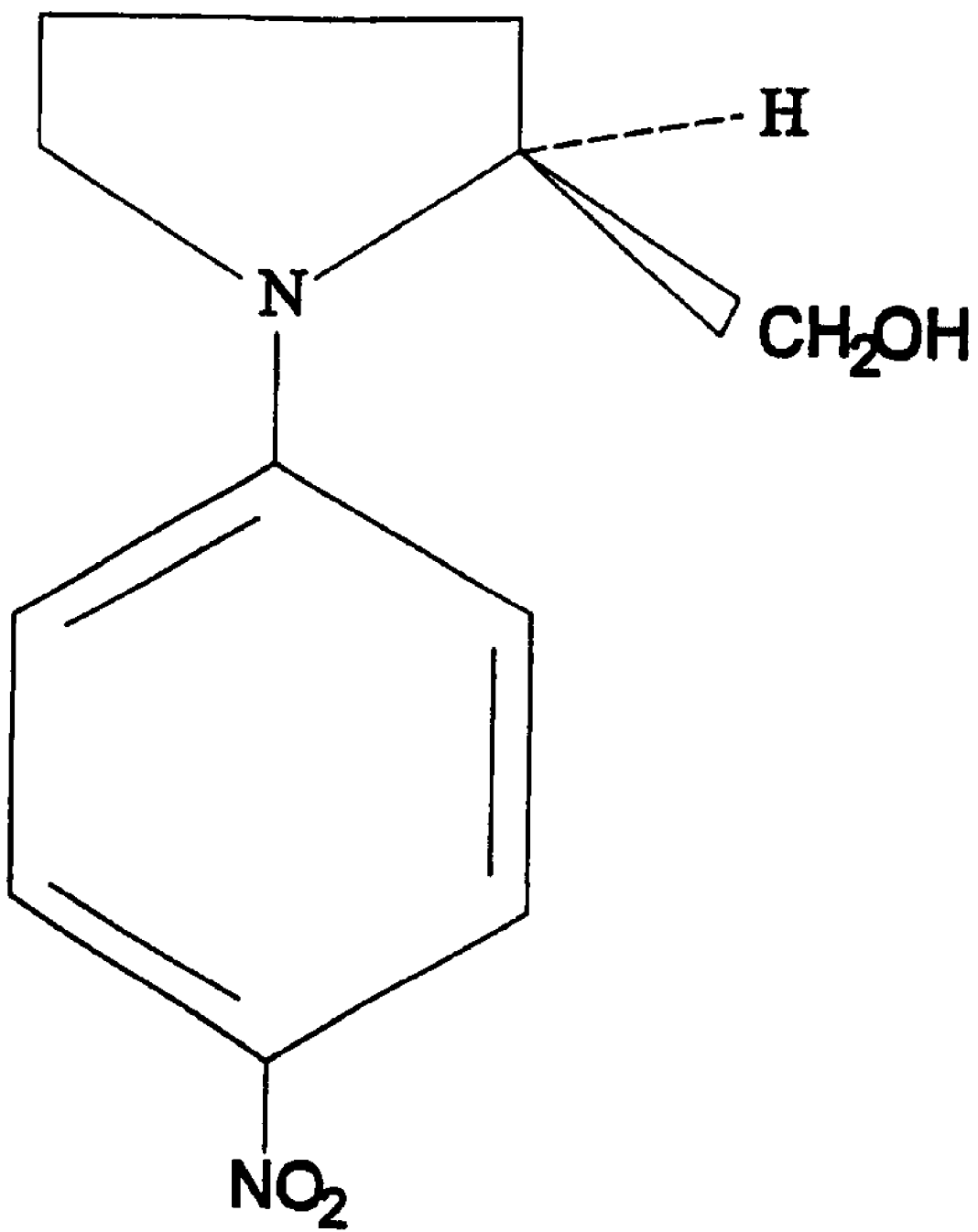
FIG. 7 is a schematic illustration of the molecular structure of NPP, which is suitable as a NLO material for the methods of FIGS. I and 3.

A plot of relative transmittance on the ordinate axis 62 versus wavelength, in units of nanometers on the abscissa axis 64 is illustrated in FIG. 6. The relative transmittance of the control substrate (having only a rubbed polyimide alignment layer), shown at 66, increases monotonically with wavelength, and is independent of polarization state. The relative transmittance of the exemplary structure 40 is shown to be lower for the incident light polarized in a direction substantially parallel to the rubbing direction (shown at 67) as compared to that for light polarized substantially perpendicular thereto (shown at 68). The difference in transmittance indicates that the NPP molecules are preferentially aligned along the rubbing direction, which is consistent with the formation of a crystalline NPP layer. The molecular structure of NPP is not symmetric along the $NO_2$—N axis as shown in FIG. 7. NPP crystals typically have a monoclinic crystal structure and a relatively large electro-optic coefficient.

The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.

What is claimed is:

1. A method for fabricating a crystalline, non-linear optical film, said method comprising:
providing a substrate; an alignment layer material including elongated polymeric molecules; and at least one non-linear optical material;
depositing a thin layer of said alignment layer material on at least one surface of said substrate;
aligning the molecules of said alignment material in a substantially uniaxial direction; and
depositing a layer of said at least one non-linear optical material on said alignment layer material.

2. The method of claim 1 wherein said substrate is selected from a member of the group consisting of fused quartz, glass, silicon, gallium arsenide, an alkali halide, plastic, polycarbonate, acrylic, and poly(methylmethacrylate).

3. The method of claim 2 wherein said substrate is glass.

4. The method of claim 1 wherein said substrate is substantially optically transparent.

5. The method of claim 1 wherein said alignment layer material is selected from the group consisting of polyimide and polyvinyl alcohol.

6. The method of claim 1 wherein said aligning comprises applying an electromagnetic field to said alignment layer material.

7. The method of claim 1 wherein said aligning comprises mechanically rubbing the alignment layer material in a uniaxial direction with an implement selected from the group consisting of a nylon pile and a brush.

8. The method of claim 1 wherein said aligning comprises:

aligning the molecules of said alignment layer in a first region;

aligning the molecules of said alignment layer in a second region in a direction oriented at a non-zero angle relative to the molecules in said first region.

9. The method of claim 8 wherein said non-zero angle is about 90°.

10. The method of claim 1 wherein said non-linear optical material comprises a material that forms crystals, which generate a response output that is disproportionate to an electromagnetic radiative input.

11. The method of claim 1 wherein said non-linear optical material comprises an organic material.

12. The method of claim 1 wherein said non-linear optical material is selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC).

13. The method of claim 1 wherein said non-linear optical material comprises N(4-nitrophenyl)-(L)-prolinol (NPP).

14. The method of claim 1 wherein said depositing a layer of said non-linear optical material is selected from the group consisting of spin coating, vapor deposition, solvent evaporation, and slowly cooling a molten liquid of the material.

15. The method of claim 1 wherein said depositing a layer of nonlinear optical material comprises:

depositing a seed layer of said nonlinear optical material; and depositing a thicker layer of said nonlinear optical material.

16. The method of claim 1 wherein said depositing a layer of nonlinear optical material comprises:

depositing a seed layer of a first nonlinear optical material; and depositing a thicker layer of a second nonlinear optical material.

17. A method for fabricating a crystalline, non-linear optical film, said method comprising:

providing a substrate, said substrate being selected from the group consisting of glass, silicon, and germanium;

providing an alignment layer material including elongated polymeric molecules;

providing at least one non-linear optical material, said non-linear optical material being selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC);

depositing a thin layer of said alignment layer material to at least one surface of said substrate;

aligning the molecules of said alignment material in a substantially uniaxial direction; and depositing a layer of said at least one non-linear optical material on said alignment layer material.

18. The method of claim 17 wherein:

said aligning the molecules of said alignment material comprises mechanically rubbing the alignment layer material in a uniaxial direction with an implement selected from the group consisting of a nylon pile and a brush; and said depositing a layer said at least one non-linear optical material is selected from the group consisting of solvent evaporation and cooling a molten liquid of the non-linear optical material.

19. A method for fabricating a crystalline, non-linear optical film, said method comprising:
- providing a substrate, said substrate being selected from the group consisting of glass, silicon, and germanium;
- providing an alignment layer material including elongated polymeric molecules;
- providing at least one non-linear optical material, said non-linear optical material being selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC);
- depositing a thin layer of said alignment layer material to at least one surface of said substrate;
- aligning the molecules of said alignment layer in a first region;
- aligning the molecules of said alignment layer in a second region in a direction substantially perpendicular to the molecules in said first region;
- depositing a layer of said at least one non-linear optical material on said alignment layer material.

20. A method for fabricating an ordered non-linear optical film, said method comprising:
- providing a substrate; an alignment layer material including elongated polymeric molecules; and at least one non-linear optical material;
- depositing a thin layer of said alignment layer material on at least one surface of said substrate;
- aligning the molecules of said alignment layer material in a substantially uniaxial direction;
- depositing a seed layer of one of said at least one non-linear optical material on said alignment material; and
- depositing an other layer of one of said at least one non-linear optical material on said seed layer.

21. The method of claim 20 wherein said substrate is glass.

22. The method of claim 20 wherein said alignment layer material is polyimide.

23. The method of claim 20 wherein said at least one non-linear optical material is selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC).

24. The method of claim 23 wherein said nonlinear optical material comprises N-(4-nitrophenyl)-(L)-prolinol (NPP).

25. The method of claim 20 wherein said seed layer comprises a first non-linear optical material and said other layer comprises a second non-linear optical material.

26. The method of claim 20 wherein said seed layer comprises N-(4-nitrophenyl)-(L)-prolinol (NPP) and said other layer comprises a nonlinear optical material selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC).

27. A crystalline non-linear optical film fabricated by the method of:
- providing a substrate; an alignment layer material including elongated polymeric molecules; and at least one non-linear optical material;
- depositing a thin layer of said alignment layer material to at least one surface of said substrate;
- aligning the molecules of said alignment material in a substantially uniaxial direction; and depositing a layer of said at least one non-linear optical material on said alignment layer material.

28. The film of claim 27 wherein said substrate is selected from the group consisting of glass, silicon and gallium arsenide.

29. The film of claim 27 wherein said alignment layer material is selected from the group consisting of polyimide and polyvinyl alcohol.

30. The film of claim 27 wherein said at least one non-linear optical material is selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DMNT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC).

31. The film of claim 27 wherein said nonlinear optical material comprises N-(4-nitrophenyl)-(L)-prolinol (NPP).

32. A crystalline non-linear optical film fabricated by the method of:

providing a substrate; an alignment layer material including elongated polymeric molecules; and at least one non-linear optical material;

depositing a thin layer of said alignment layer material to at least one surface of said substrate;

aligning the molecules of said alignment layer material in a substantially uniaxial direction;

depositing a seed layer of one of said at least one non-linear optical material on said alignment material; and depositing an other layer of one of said at least one non-linear optical material on said seed layer.

33. The film of claim 32 wherein said substrate is selected from the group consisting of glass, silicon and gallium arsenide.

34. The film of claim 32 wherein said alignment layer material is selected from the group consisting of polyimide and polyvinyl alcohol.

35. The film of claim 32 wherein said at least one non-linear optical material is selected from the group consisting of N-(4-nitrophenyl)-(L)-prolinol (NPP), 4-N,N-Dimethylamino-4'N'methyl-stilbazolium tosylate (DAST), 2-methyl-4-nitroaniline (MNA), 2-amino-5-nitropyridine (2A5NP), p-cholorophynylurea (PCPU), 4-(N,N-dimethylamino)-3-acetamidonitrobenzene (DAN), N-(5-nitro-2-pyridyl)-(S)-phenylalalinol (NPPA), 3-acetamino-4-methoxy-N-(4-nitrobenzylidene) aniline (MNBA), 4'-nitrobenzylidene-3-acetamino-4-methoxy-aniline (MNBA), 4-nitro-4'-methylbenzylidene aniline (NMBA), 4-aminobenzophynel, L-arginum dihydrogen phosphate (LAP), 3-methyl-4-methoxy-4'-nitrostilbene (MMONS), methyl-(2,4-dinitrophenyl)-aminopropanoate (MAP), 2-cyclo-octylamino-5-nitropyridine(COANP), 3-methyl-4-nitro-pyridine-1-oxide (POM), dimethyl-aminocyanobenzene (DMACB), N-(5-nitro-2-pyridyl)-(S)-phenylalaninol (NPPA), 3,5-dimethyl-1-(4-nitrophenyl)-pyrazole (DMNP), 3,5-dimethyl-1-(4-nitrophenyl)-1,2,4-triazole (DANT), (−)2-(α-methylbenzylamino)-5-nitropyridine (MBANP), 2-adamantylamino-5-nitropyridine (AANP), (−)-4-(4'-dimethylamino-phenyl)-3-(2'-hydroxypropylamino)cyclo butene-1,2-dione (DAD), 1-(2-thienyl)-3-(4-tolyl)propene-1-one (T-17), 3-(4-dimethyl-aminophenyl)-1-(4-cyanophenyl)phenyl)-2-propene-1-one (DACC), 4-bromo-4'-methoxy-chalcone (BMC), and 4-methoxy-4'-ethoxychalcone (MEC).

36. The film of claim 32 wherein said seed layer comprises N-(4-nitrophenyl)-(L)-prolinol (NPP).

* * * * *